3,016,402
BORAAROTHIAZOLO BORAZINES
James J. Harris, Oakmont, Pa., assignor to Koppers Company, Inc., a corporation of Delaware
No Drawing. Filed Dec. 17, 1959, Ser. No. 860,084
9 Claims. (Cl. 260—551)

This invention relates to novel fused ring borazines and to the method of their preparation. In one specific aspect, it relates to novel borazines having one or more fused arothiazolo ring systems, formed by the reaction of boron halides with ortho-mercapto anilines.

In my copending application, S.N. 860,072 filed jointly with Bernard Rudner on December 17, 1959, there are described and claimed novel borazines having one or more fused aroxazolo ring systems, formed by the reaction of boron halides with primary aryl amines containing, in a position ortho to the amino group, either a hydroxyl or lower alkoxy radicals. I have now discovered a new class of borazines which have three arothiazolo ring systems fused to the borazine nucleus.

Although the compounds of my copending application have some similarity in structure to those of the present invention, marked differences, from the stand point of preparative method and utility, exist between the two classes of compounds. As I have noted, the compounds of my copending application can be prepared from either alcohols or ethers. I have found that the novel method based on a dehydrohalogenation-ether cleavage reaction, which can be used to prepare many of the boraaroxazolo borazines, is unsuitable when ortho-aminothioethers are used as reactants; hence, the compounds of the invention are readily prepared only from the ortho-aminothiophenols (ortho-mercapto anilines).

The compounds of my copending application are used in the preparation of new and useful dyestuffs, polymers, lubricating oils and hydraulic fluids. Those of the present application are effective primarily as rubber additives. Thus, when the compounds of the invention are added in small amounts, e.g. from 0.5–5%, to a conventional rubber mix, they serve to accelerate the reaction between sulfur and rubber, although their activity varies somewhat with the particular compound used. In addition to their use as rubber chemicals, the boraarothiazolo borazines exhibit biocidal and fungicidal activity. In fungicidal applications they can be applied from a suitable solvent, e.g. dimethylsulfoxide, in amounts up to about 7 p.p.m. to agricultural crops to inhibit mold and rot.

It is, therefore, an object of the present invention to provide a new and useful class of cyclized or fused ring-containing borazines. It is a further object to provide a novel and economical method by which the borazines of the invention are obtained.

In accordance with the invention, I have discovered a new generic class of borazines, containing three benzenoid and sulfur-containing ring systems fused to the borazine nucleus, of the general formula:

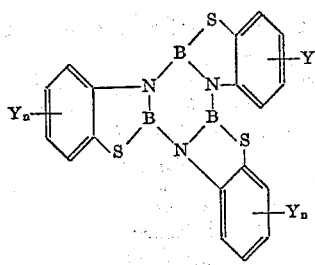

In the above formula Y is a member selected from the group consisting of hydrogen, halo, nitro, lower alkyl and lower alkoxy substituents and $n$ (the number of substitutable positions) is an integer having a value of no greater than 4. If Y is a substituent other than hydrogen, and $n$ is less than 4, the remaining substitutable positions are occupied by hydrogen atoms.

The novel fused ring borazines are made by reacting an ortho-mercapto aniline with a boron halide, suitably in the presence of an inert solvent. The fused ring borazine is recovered from the reaction mixture using conventional techniques.

The starting ortho-mercapto anilines (also called ortho-aminothiophenols) can be prepared by a variety of well-established reactions, e.g. (1) the Herz reaction, involving hydrolysis of a sulfur-containing heterocycle, e.g.

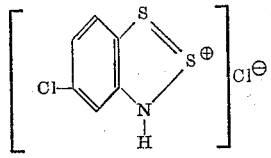

formed by the Lewis acid catalyzed condensation of sulfur monochloride with a primary aryl amine, and (2) the Hugershoff or Jacobsen reactions, involving oxidative ring closure of an arylthiourea (the former with bromine, the latter with an alkali ferricyanide) followed by hydrolysis. Suitable ortho-mercapto anilines are those containing either no substituents on the aryl nucleus (where in Y in the above formula is hydrogen and $n$ is 4) or those containing one or more halo, nitro, lower alkyl or lower alkoxy substituents.

The most useful boron halides for purposes of the invention are boron trichloride and tribromide. The use of boron trifluoride or triiodide is possible, but less desirable; the former is not preferred because of its decreased reactivity, the latter because of its instability.

To facilitate product recovery and to promote contact between the reactants, the reaction is suitably conducted in the presence of an inert organic solvent. Useful solvents include hydrocarbons, e.g. tetralin, benzene, cyclohexane, xylene, decane, and the like; halohydrocarbons, e.g. chloroform, trichlorobenzene, bromobenzene, and the like; and nitrogeneous hydrocarbons, e.g. nitrobenzene. For purposes of the invention the particular solvent used is relatively unimportant, but it is necessary to use a solvent which is substantially inert to the reactants and products.

The mole ratio of boron halide to amine is governed by practical, rather than theoretical requirements. To obtain the maximum yield of a particular fused ring borazine (i.e. to avoid the formation of complex mixtures of products), it is desirable to mix the reactants in substantially stoichiometric quantities. It is helpful, but by no means necessary, to provide a slight stoichiometric excess of boron halide to promote completion of the reaction.

The order of addition of the reactants is relatively unimportant. Since boron trichloride and boron trifluoride are normally gaseous at room temperature, the reaction may be conveniently conducted by dissolving the ortho-mercapto aniline in a solvent and adding gaseous boron halide thereto in the form of small bubbles to promote intimacy of contact, thereby increasing the efficiency of the reaction. Normally, however, I prefer to condense boron trichloride and add it as a liquid.

The reaction is conducted at a temperature ranging between room temperature (ca. 25° C.) and the boiling point (reflux temperature) of the particular solvent used. Thus, any temperature up to about 210° C. is quite suitable. It is preferable to operate at reflux temperature, since this facilitates the removal of the hydrogen halide evolved during the dehydrohalogenation to form the borazine ring and during ring closure. Temperatures lower than the reflux temperature of the particular solvent selected can be effectively used if a binding agent for the hydrogen halide, e.g. pyridine, lutidine, trimethylamine, etc., is present in the reaction mixture.

The reaction is preferably conducted at atmospheric pressure to facilitate hydrogen halide removal. If a binding agent for the halide is present, higher or lower pressures can be used if desired. The use of atmospheric pressure is obviously more desirable from the standpoint of equipment costs.

Completion of the reaction is determinable by use of spectrophotometry. More conveniently, completion of reaction is established by cessation of gas evolution; a bubble counter connected to the top of the reflux condenser is an excellent indicator.

The product borazine is recovered using conventional techniques apparent to those skilled in the art. The compounds of the invention tend to be less soluble and more stable to hydrolysis than those of my copending application. Thus, it is convenient simply to filter the reaction mixture to separate the product. Alternatively, the product can be recovered by vacuum evaporation of the reaction mixture. The crude material thus obtained can be purified by extraction, recrystallization from solvents such as benzene and chlorobenzene, or sublimation.

My invention is further illustrated by the following examples.

*Example I*

A 2-liter, 3-necked flask is fitted with a gas inlet tube leading to a dry-ice-chilled cold finger condenser, a Trubore stirrer, and a reflux condenser topped by a dry-ice-filled cold finger condenser leading to a dry-ice-cooled vapor trap, then finally to an exit bubbler containing mineral oil. The flask is charged with 151 g. (1.21 moles) of o-aminobenzenethiol in 1-liter of chlorobenzene. 145 g. (1.24 moles) boron trichloride is added thereto and the reaction mixture is refluxed for 12 hours. During the refluxing operation there is a very rapid evolution of hydrogen chloride with the simultaneous formation of a yellow precipitate in the flask. The reaction mixture is filtered to give 75.5 g. of crude tris-(2-borabenzothiazolo [3,2-a(c,e)])borazine, representing a 47% yield of crude product. Its combustion analysis values are as follows:

| Element | Found, percent | Theoretical for $B_3N_3S_3C_{18}H_{12}$, percent |
| --- | --- | --- |
| Carbon | 54.22 | 54.19 |
| Hydrogen | 2.93 | 3.03 |
| Boron | 8.44 | 8.14 |
| Nitrogen | 10.63 | 10.53 |
| Sulfur | 24.38 | 24.11 |

The infrared spectrum showed very strong absorption peaks at 6.83 and 7.23μ and a strong peak at 14.8μ, and medium intensity peaks at 13.36 and 13.99μ.

Removal of solvent from the filtrate at reduced pressure gives 82 g. (51%) additional solid product. Both fractions give white fluffy solids with identical appearance, and melting at 370–373, after purification by vacuum sublimation. Hence, the total yield of crude products 98%.

*Example II*

A 2-liter, 3-necked flask is fitted with a pressure equalized separatory funnel, Trubore stirrer, and reflux condenser leading to an exit bubbler containing mineral oil. The flask is charged with 126 g. (1.01 moles) of o-aminobenzenethiol in 1-liter of chlorobenzene. 261 g. (1.04 moles) boron tribromide is added thereto and the reaction mixture is refluxed for 10 hours. During the refluxing there is a very rapid evolution of hydrogen bromide with the simultaneous formation of a yellow precipitate in the flask. The reaction is filtered, giving 115 g. crude product, representing a yield of 85%, with melting point and infrared spectra, after purification by vacuum sublimation, identical to that produced in Example I.

*Example III*

A flask fitted as in Example I is charged with 160 g. (1.07 moles) 2-mercapto-5-chloroaniline in 1200 ml. chlorobenzene. 129 g. (1.1 moles) boron trichloride is then added thereto. The reaction mixture is refluxed for 15 hours with very rapid HCl evolution and simultaneous formation of a yellow precipitate. Filtration of the cooled mixture gives 145 g. of yellow precipitate (melting above 350° C.) representing a yield of about 81%.

*Example IV*

A flask fitted as in Example I is charged with 110 g. (0.72 moles) 2-mercapto-4-ethylaniline in 1-liter chlorobenzene. 88 g. (0.75 moles) boron trichloride is then added thereto. The reaction mixture is refluxed for 20 hours, during which time a yellow precipitate is formed. Filtration gives 40 g. dark yellow solid, representing a 38% yield. Purification by vacuum sublimation gives white, high melting crystals.

I claim:

1. A compound of the formula:

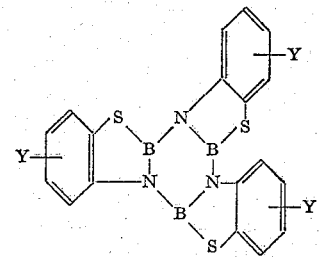

wherein Y is a member selected from the group consisting of hydrogen, halo, and lower alkyl, the remaining substitutable positions of the benzenoid nucleus being occupied by hydrogen.

2. A compound according to claim 1 wherein Y is halo.

3. A compound according to claim 1 wherein Y is lower alkyl.

4. Tris - (5 - chloro-2-borabenzthiazolo[3,2-a(c,e)])-borazine.

5. Tris - (4 - ethyl - 2 - borabenzthiazolo[3,2-a(c,e)])-borazine.

6. Method of making a tris(borobenzthiazolo) borazine of the formula:

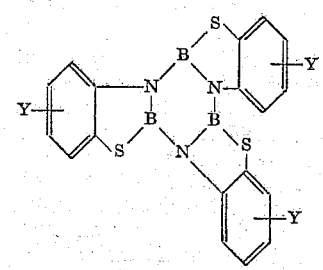

wherein Y is a member selected from the group consisting of hydrogen, halo, and lower alkyl, the remaining substitutable positions of the benzenoid nucleus being occupied by hydrogen, comprising reacting an ortho-mercapto aniline of the formula:

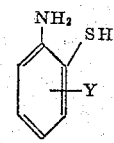

wherein Y is as defined aforesaid, with a boron trihalide at a temperature between ambient temperature and the boiling point of the reaction mixture and recovering said borazine from the reaction mixture.

7. Method according to claim 6 wherein the reaction is conducted in the presence of an inert organic solvent and the reaction temperature is 25–210° C.

8. Method according to claim 7 wherein substantially stoichiometric quantities of the reactants are used and the reaction is conducted at substantially atmospheric pressure.

9. Tris-(2-borabenzthiazolo[3,2-a(c,e)]) borazine.

No references cited.